(12) United States Patent
Lemoine et al.

(10) Patent No.: US 7,764,602 B2
(45) Date of Patent: Jul. 27, 2010

(54) METHOD AND SYSTEM FOR PROTECTING A COMMUNICATION NETWORK, SAID COMMUNICATION NETWORK INCLUDING A TRANSPORT NETWORK

(75) Inventors: Benoît Lemoine, Lannion (FR);
Morgane Le Foll, Tregastel (FR);
Géraldine Calvignac, Trebeurden (FR)

(73) Assignee: France Telecom, Paris (FR)

( * ) Notice: Subject to any disclaimer, the term of this patent is extended or adjusted under 35 U.S.C. 154(b) by 715 days.

(21) Appl. No.: 11/568,663

(22) PCT Filed: May 7, 2004

(86) PCT No.: PCT/EP2004/005077

§ 371 (c)(1),
(2), (4) Date: Dec. 15, 2006

(87) PCT Pub. No.: WO2005/109706

PCT Pub. Date: Nov. 17, 2005

(65) Prior Publication Data

US 2008/0285439 A1 Nov. 20, 2008

(51) Int. Cl.
*G01R 31/08* (2006.01)
*H04J 1/16* (2006.01)
(52) U.S. Cl. ................................... 370/225; 370/244
(58) Field of Classification Search ......... 370/216–228, 370/241, 242, 244, 351, 389; 709/220, 221
See application file for complete search history.

(56) References Cited

U.S. PATENT DOCUMENTS 6,801,504 B1 10/2004 Ito
7,200,109 B2 * 4/2007 Semaan ...................... 370/223
2005/0018600 A1 * 1/2005 Tornar ......................... 370/216
2005/0053067 A1 * 3/2005 Yasukawa et al. ........... 370/389

FOREIGN PATENT DOCUMENTS

EP 1 063 865 12/2000
JP 11-355314 12/1999

* cited by examiner

*Primary Examiner*—Ricky Ngo
*Assistant Examiner*—Paul Masur
(74) *Attorney, Agent, or Firm*—David D. Brush; Westman, Champlin & Kelly P.A.

(57) ABSTRACT

The invention relates to a system for protecting a communications network comprising a transport network (3) and end-channel equipment (1) such as routers each connected to said transport network (3) by connecting sections wherein said protective system is provided with first and second protective systems. Said invention is characterized in that for each communications channel between two pieces of said end-channel equipment (1), the first protective system is activated when a failure is detected in said transport network (3) which emits a direct channel alarm message (AU-AIS) to equipment on the downstream end thereof, said second protective system is activated, after detection by end equipment of said channel (1) of a failure in the connection section connecting it to said transport network or when equipment (1) of the downstream end of said channel receives the direct or indirect alarm message (AU-AIS, AU-RDI) emitted by the transport network and the second protective system is activated, after reception of the direct alarm message (AU-AIS), with a delay longer than after detection of the failure on a second connection section between said transport network (3) and end-channel equipment (1). A protection method carried out by said protective system is also disclosed.

13 Claims, 4 Drawing Sheets

METHOD AND SYSTEM FOR PROTECTING A COMMUNICATION NETWORK, SAID COMMUNICATION NETWORK INCLUDING A TRANSPORT NETWORK

RELATED APPLICATIONS

The present application is based on, and claims priority from, International Application Number PCT/EP04/005077, filed May 7, 2004, the disclosure of which is hereby incorporated by reference herein in its entirety.

FIELD OF THE INVENTION

The present invention concerns a system for protecting a communication network, said communication network including a transport network and path terminating routers, elements, e.g. respectively connected to said transport network by connection sections.

The present invention applies more particularly, but not exclusively, to communication networks referred to as long-distance networks, for example of the IP (Internet Protocol), MPLS (Multi-Protocol Label Switching) or ATM (Asynchronous Transfer Mode) type. The remainder of the description will be based essentially on networks of the IP on MPLS type (denoted IP/MPLS in the description) given solely by way of example, but it should be understood that the invention is not limited to such networks.

BACKGROUND OF THE INVENTION

It should be noted that MPLS networks are described in specifications of the IETF (Internet Engineering Task Force) organisation and are based essentially on packet switching technologies comprising a fixed-length label in correspondence with an IP address. In the long-distance network, these packets follow a path which is generally referred to as an LSP (Label Switched Path). Long-distance networks of the MPLS type which are concerned here are either in non-connected mode, for example based on the so-called LDP (Label Distribution Protocol) or in connected mode, for example of the IP/MPLS-TE type.

Figure 1:
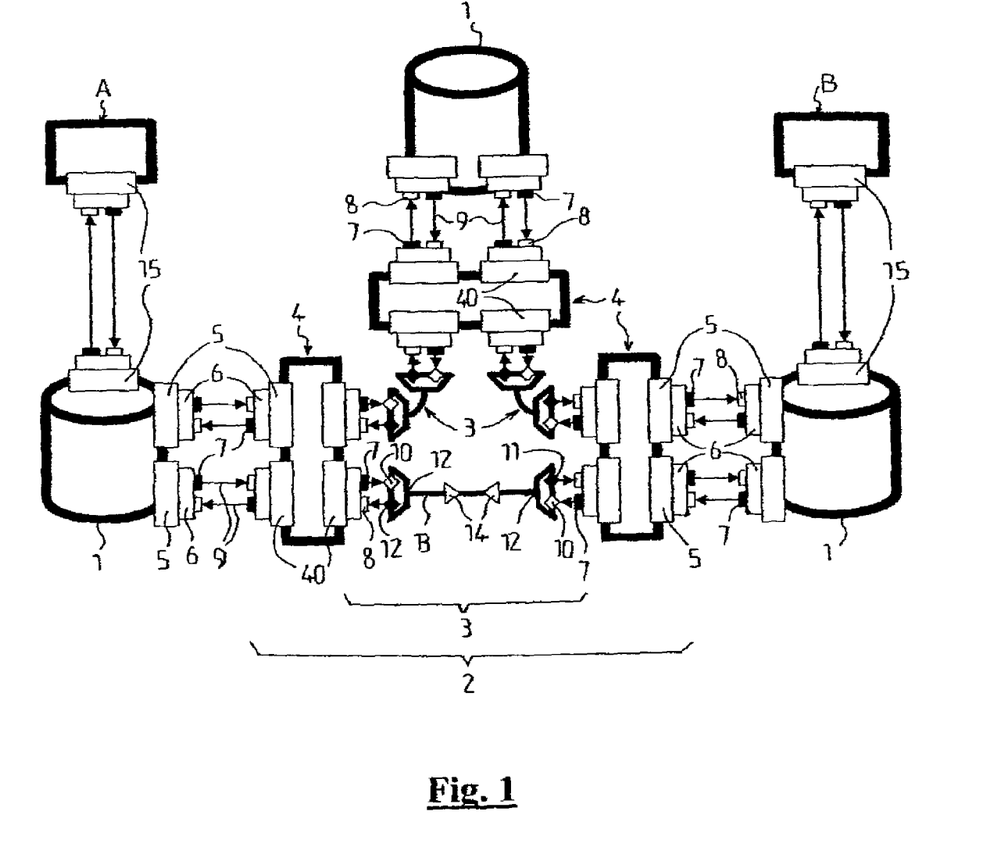
FIG. 1 is a general block diagram of an IP/MPLS type communication network to which the present invention can apply.

FIG. 1 depicts the architecture of a prior art long-distance network, for example of the IP/MPLS type, in this case allowing communication between a user A and a remote user B by means of packets. It includes a plurality of path terminology elements, e.g., routers 1, for example of the IP/MPLS type, interconnected by one or more long-distance transport networks 2.

A long-distance transport network 2 in general comprises one or more point-to-point long-distance transmission systems 3, for example of the optical type with wavelength division multiplexing (WDM) interconnecting different equipments 4, for example add/drop multiplexers 40 (or cross-connect systems) with or without a control plane, but also regeneration equipments (such equipments are not depicted in FIG. 1), which, at the physical level, support a synchronous digital hierarchy, for example of the SONET or SDH type (subsequently referred to as SONET/SDH).

Reference can be made in particular to ITU-T recommendations G.707 and G.783 for further information regarding the SDH hierarchy. Optical networks, supporting a synchronous digital hierarchy, for example SDH, of the type with a control plane, are the subject of the first amendment to ITU-T recommendation G.8080/Y.1304 (2001) entitled: Architecture for the Automatically Switched Optical Network (ASON).

In the terminology of the SDH standard, the communication medium between two termination equipments or path terminating elements, in this case two routers 1, is called a "path, the communication medium between two multiplex equipments 40 or between a termination equipment, in this case a router 1, and a multiplex equipment is called a "multiplex section", and the communication medium between two regeneration equipments or between a multiplex equipment 40 and a regeneration equipment is called a "regeneration section". For generality purposes, in the present description, the communication medium between two SONET/SDH equipments will be called a "section" or "connection section".

Subsequently, it will be considered that the path terminating elements are routers such as the routers 1.

The SONET/SDH equipments 4 are also linked to the IP/MPLS routers 1 and, to do this, the IP/MPLS routers and the SONET/SDH equipments have SONET/SDH interface cards 5 themselves comprising one or more SONET/SDH ports 6. Each SONET/SDH port has an optical transmitter 7 (in general a laser converting a modulated electrical signal into a modulated optical signal) and an optical receiver 8 (in general a photodiode converting a modulated optical signal into a modulated electrical signal). Optical fibres or optical fibre butt joints 9 are generally used to link the optical transmitter 7 of a first SONET/SDH port 6 to the optical receiver 8 of a second SONET/SDH port 6 and to link the optical transmitter 7 of the second SONET/SDH port 6 to the optical receiver 8 of the first SONET/SDH port 6.

WDM type long-distance transmission systems 3 generally comprise, on the one hand, transmitting transponders 10 converting the modulated optical signal on any carrier received from an optical transmitter 7 of a SONET/SDH port 6 into a modulated optical signal whereof the carrier is accurately known and, on the other hand, receiving transponders 11 converting a modulated optical signal whereof the carrier is accurately known received from a transponder 10 into a modulated optical signal on any carrier which is then supplied to an optical receiver 8 of a SONET/SDH port. They also comprise multiplexers/demultiplexers 12 making it possible to transmit over the same optical fibre 13 several modulated optical signals whereof the carriers are different and to separate according to their carrier the modulated optical signals received on the same fibre. They also comprise line amplifiers 14 making it possible to regenerate the optical signal at the end of an optical fibre before reinjecting it into the next optical fibre. Optical fibres or optical fibre butt joints (not referenced) are generally used to link the transmitting transponders 10 to the multiplexers/demultiplexers 12, the multiplexers/demultiplexers 12 to the line amplifiers 14, the line amplifiers 14 to the multiplexers/demultiplexers 12 and the multiplexers/demultiplexers 12 to the receiving transponders 11. Similarly, optical fibres or optical fibre butt joints (not referenced) are generally used to link an optical transmitter 7 of a SONET/SDH port 6 to a transmitting transponder 10 of a long-distance transmission system 3 and to link the optical receiver 8 of the same SONET/SDH port 6 to a receiving transponder 11 of the same long-distance transmission system 3.

Finally, in order to link the user equipments A and B to the IP/MPLS routers 1, the latter, as well as the user equipments A and B, generally have cards 15 that can for example support, at physical layer level, either the Ethernet protocol or the SONET/SDH protocol.

There will now be described in connection with FIG. 2 an IP/MPLS router such as the routers 1 of the IP/MPLS network depicted in FIG. 1. Such an IP/MPLS router generally consists of one or more ports 11 (a single SONET/SDH port is depicted in full in FIG. 2) and a routing unit 20.

A SONET/SDH port 11 comprises an optical receiver 111 generally implemented by a photodiode which converts a modulated optical signal into a digital signal and an optical transmitter 112 generally implemented by an optical laser which converts a digital signal into a modulated optical signal.

It should be noted here that the SONET (Synchronous Optical Network) and SDH (Synchronous Digital Hierarchy) hierarchies concern systems for synchronous transmission by Synchronous Transport Module (STM for SDH) in the form of synchronous frames, comprising a Multiplex Section Overhead (SOH) and a payload consisting essentially of one or more Virtual Containers (VC) of different hierarchical levels: VC4 and VC3 for high order containers and VC2 and VC1 for low order containers. Each of these virtual containers also comprises a Path Overhead (POH) and a payload generally denoted AU-n (Administrative Unit, level n). It should be noted that reference can be made in particular to ITU-T recommendations G.707 and G.783 for further information regarding the SDH hierarchy.

Figure 2:
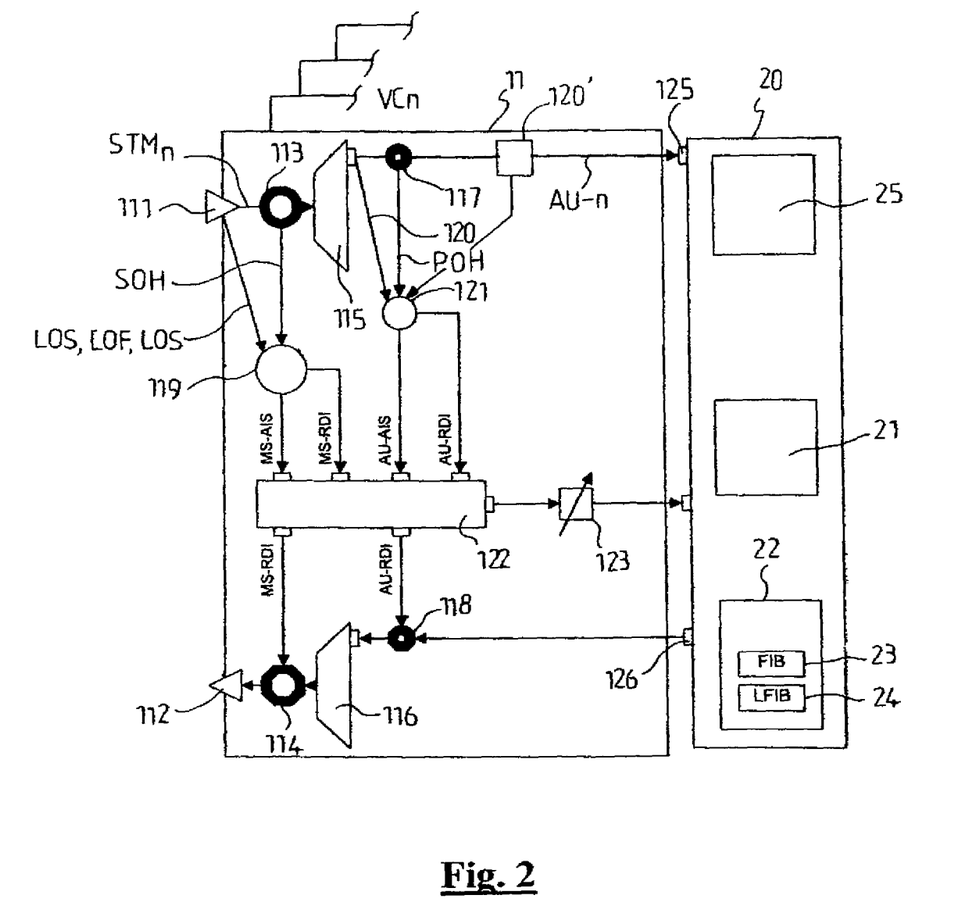
FIG. 2 is a general block diagram of a router of the prior art.

In a synchronous hierarchy port of an IP/MPLS router such as that depicted in FIG. 2, from the synchronous transport module STM present at the output of the optical receiver 111, its SOH overhead is extracted in an extraction unit 113. Its payload is demultiplexed in a demultiplexing unit 115 in order to recover the virtual containers VC from which the POH overheads are extracted in an extraction unit 117 at the output of which the corresponding administrative units AU-n are available. On the sending side, the administrative units AU-n become virtual containers after addition of a POH overhead in a unit 118, which are then multiplexed in a multiplexing unit 116, it being understood that the virtual containers can be associated by a contiguous or virtual concatenation so as to be grouped together or be used directly, and then become synchronous transport modules after addition of the corresponding SOH overhead. Finally, the transport modules STM are supplied to the transmitter 112.

The routing unit 20 comprises a routing control unit 21, a transfer unit 22 including in particular a routing table 23 based on the IP address (FIB: Forward Information Base) and a routing table 24 based on the MPLS label (LFIB: Label Forward Information Base) and, finally, a unit 25 for assigning logical ports in relation to the physical ports 125 and 126 of the routing unit 20. These physical ports 125 and 126 are linked to the corresponding outputs of the physical ports (not referenced) of the port or ports 11. The transfer of an IP/MPLS packet therefore consists of routing it from a logical input port to a logical output port according to its destination IP address or according to the MPLS label of the LSP path which it marks in the SONET/SDH transport network. The IP routing tables and the MPLS routing tables are generally used during this operation.

The IP routing table 23 in general stores IP prefixes and, for each IP prefix, the identifier of the logical port to which the IP packets whereof the destination IP addresses belong to this IP prefix have to be sent. It can also store IP prefixes and, for each IP prefix, the identifier of the logical port to which the IP packets whereof the destination IP addresses belong to this IP prefix have to be sent, and the MPLS label to be added to the IP packet when the latter enters an MPLS label switched path (LSP) which leads to the destination.

The MPLS routing table 24 in general stores the MPLS labels of LSP paths of the network and, for each MPLS label, the identifier of the logical output port to which an MPLS packet marked with this label has to be sent, and the action to be performed on the label: replacing it by a new MPLS label when the packet under consideration is in LSP path transit and, in this case, including the value of the label of the new LSP path in the MPLS routing table, or deleting this label in the case where the packet leaves the MPLS network.

In general, a logical port is associated with one or more physical ports. Where the physical ports are SONET/SDH ports, a logical port can be associated with one or more unidirectional or bidirectional SONET/SDH paths (path means any concatenated or virtually concatenated virtual container) In the case of unidirectional SONET/SDH paths, the input of a logical port is associated with the output of one or more unidirectional SONET/SDH paths and the output of a logical port is associated with the input of one or more unidirectional SONET/SDH paths. In the case of bidirectional SONET/SDH paths, the input of a logical port is associated with the output of one or more bidirectional SONET/SDH paths and the output of a logical port is associated with the input of the same bidirectional SONET/SDH path or paths.

Where the physical ports are SONET/SDH ports, the IP/MPLS packets are in general encapsulated at the physical level in PPP/HDLC (Point-to-Point Protocol/High-level Data Link Control: see request in RFC1662 comments) frames, themselves encapsulated in SONET/SDH virtual containers (concatenated or virtually concatenated); the IP/MPLS packets can also be encapsulated in other standardised formats, for example using in particular a GFP (Generic Framing Procedure) framing, themselves encapsulated in SONET/SDH virtual containers (concatenated or virtually concatenated).

Each element (equipment, connection section line, etc.) of a long-distance IP/MPLS network or of the long-distance transport network it includes is liable to fail. The most common failures are the result of cutting by civil engineering machines of the optical fibres buried over long distances and which link the different elements of long-distance transmission systems. Other types of failure are possible, in particular hardware malfunction of a network equipment or software malfunction of an IP/MPLS router card.

IP/MPLS routers in general have several mechanisms making it possible to re-establish the IP/MPLS traffic impacted by a malfunction occurring in the long-distance IP/MPLS network. Among others there can be cited IP or MPLS rerouting in non-connected mode, for example based on the LDP protocol, which makes it possible to re-establish IP traffic in general in a few seconds after the failure, MPLS-TE (MPLS Traffic Engineering) restoration which makes it possible to re-establish MPLS traffic in general in a few seconds after the failure, end-to-end MPLS-TE protection which makes it possible in general to re-establish MPLS traffic in a few hundred milliseconds after the failure and MPLS-TE local protection which makes it possible in general to re-establish MPLS traffic in a few tens of milliseconds after the failure.

Generally carried out by the routing units 20 of the IP/MPLS routers 1, IP rerouting consists of recalculating new IP routing tables by deleting from the topology the links impacted by the failure and determining a new path to each destination IP prefix. When the path to a prefix has changed and, therefore, the logical port has become different, the information contained in the IP routing table or tables 23 for this prefix is modified by considering that the IP packets must no longer be sent on the logical ports corresponding to the path impacted by the failure, but to one of the other logical ports corresponding to the new path. The process of updating the IP routing tables in general lasts several seconds since it requires the exchange of IP control packets between the IP/MPLS routers. The rerouting time then corresponds to the time for detecting the fault, the time for propagating the information through the network, the possible delay before recalculation of the new routes, recalculation of the routes, and then to the time for updating the information in the routing tables.

Also generally carried out by the routing units 20 of the IP/MPLS routers 1, MPLS-TE restoration in general consists of recalculating the route of the LSP paths impacted by the failure and replacing the MPLS routing table or tables 24 by one or more new tables comprising, for each MPLS label associated with the identifier of a logical port impacted by the failure, a new logical port identifier and a new MPLS label. MPLS-TE restoration is a little faster than IP rerouting, but can last several seconds. This is because it necessitates waiting for the propagation of the fault information to the head routers of the LPS paths which then recalculate their paths.

Also generally carried out by the routing units 20 of the IP/MPLS routers 1, end-to-end MPLS-TE protection in general consists of replacing the MPLS routing tables 24 by new tables comprising, for each MPLS label associated with the identifier of a logical port impacted by the failure, a backup logical port identifier and a backup MPLS label which are predetermined. MPLS-TE end-to-end protection is faster than MPLS-TE restoration since it does not require recalculation of the route of the LSP paths and since it consists of switching an LSP path to another pre-established protection one, but even so can last several hundred milliseconds (since it is always necessary to wait for propagation of the fault information to the head routers of the MPLS-TE LPS).

Finally, generally carried out this time by the packet switching cards, MPLS-TE local protection in general consists of replacing in the MPLS label tables the identifier of a logical port impacted by the failure by the identifier of a backup logical port and an MPLS label corresponding to the backup section which are also both predetermined. MPLS-TE local protection is generally fast and lasts only a few tens of milliseconds, since it is performed by the router directly upstream of the fault and consists of switching the LSP paths closest to the fault to predetermined backup sections.

As regards SONET/SDH equipments, they also have several mechanisms making it possible to re-establish a SONET/SDH path impacted by a fault occurring in the long-distance transport network. There can be cited in particular, on the one hand, protection mechanisms, such as multiplex section protection, path protection, multiplex section shared ring protection and dynamic restoration, which make it possible to limit to less than 50 milliseconds the interruption of a SONET/SDH path impacted by a failure and, on the other hand, dynamic restoration mechanisms, for example used by a control plane such as that mentioned above with reference to ITU-T recommendation G.8080, which make it possible to limit to a few seconds the interruption of a SONET/SDH path impacted by a failure.

Multiplex section protection consists of duplicating the SONET/SDH synchronous transmission modules and sending them on two disjoint SONET/SDH multiplex sections. If one of the SONET/SDH multiplex sections is faulty, it is the synchronous transmission module received from the other SONET/SDH multiplex section which is used.

Upon detection of a fault in a multiplex section (or a regeneration section) of a SONET/SDH transport network, at least two types of so-called SONET/SDH alarm are sent: SONET/SDH multiplex section alarms (MS) and SONET/SDH path alarms (AU: Administrative Unit). For each of these two types of alarm, direct alarms (referred to as AIS: Alarm Indication Signal) and indirect alarms (referred to as RDI: Remote Defect Indication) are distinguished.

Direct multiplex section alarms (MS-AIS: Multiplex Section-Alarm Indication Signal) are generated by the local unit of a SONET/SDH port of an equipment of the transport network, for example, upon loss of optical signal (LOS: Loss of Signal) on its optical receiver, upon loss of synchronisation of the digital signal, upon loss of the SONET/SDH start of frame (LOF: Loss Of Frame), or for example upon loss of pointer (LOP: Loss Of Pointer). As regards the port 11 of a router 1, the local unit is the unit 119 depicted in FIG. 2.

As regards indirect multiplex section alarms (MS-RDI: Multiplex Section-Remote Defect Indication), these are deduced from information contained in the received multiplex module, for example, in the case of the SDH system, from the value of positions 6, 7 and 8 of byte K2 of the multiplex section overhead (SOH). These indirect multiplex section alarms MS-RDI can be inserted, for example by marking positions 6, 7 and 8 of byte K2, by means of an insertion unit such as the insertion unit 114 of the port 11 depicted in FIG. 2, in a synchronous transport module STM leaving from the port concerned following either reception in the other transmission direction of a direct multiplex section alarm MS-AIS in order to inform, in return, the sending end, or detection by the port itself of an incoming section fault (multiplex section or regeneration section).

The SONET/SDH direct path alarm (AU-AIS: Administrative Unit-Alarm Indication Signal) is generated by any SONET/SDH equipment when no digital signal can be demultiplexed into an administrative unit AU-n (see reference 120). Once such a direct path alarm AU-AIS is detected, it is propagated to the SONET/SDH equipments which are situated downstream in general by setting all the bits of the payload of the container concerned to 1 (an "all 1s" signal is then spoken of), thus avoiding a new detection downstream. So that this propagation can take place as far as the path terminating element, a SONET/SDH direct path alarm AU-AIS is also generated by any equipment upon receiving a path payload whereof all the bits are at 1 (see reference 120').

As regards the SONET/SDH indirect path alarm (AU-RDI: Administrative Unit-Remote Defect Indication), this is also deduced from information contained in the POH overhead of the corresponding container, for example in the case of the SDH system, from the value of position 5 of byte G1 contained in the POH overhead of each virtual container. These indirect path alarms AU-RDI can be inserted, in an IP/MPLS router, for example by marking position 5 of byte G1, by means of an insertion unit such as the unit 114 depicted in FIG. 2, in the POH overhead of any container of the corresponding path following either reception in the other transmission direction of a direct path alarm AU-AIS in order to inform, in return, the sending end, or detection by the port itself of a demultiplexing fault concerning this path.

The path alarms AU-AIS and AU-RDI are generated by a unit 121.

Thus, the SONET/SDH interface cards of an IP/MPLS router generate two types of SONET/SDH alarm referred to as remote since they are transmitted to the remote SONET/SDH equipment, generally upstream: remote multiplex section alarms (MS-RDI) and SONET/SDH remote path alarms (AU-RDI). These alarms are generally generated in an alarm management unit 122 according to the SONET/SDH alarms generally received on the multiplex section of the same port and generally on the SONET/SDH virtual container in the same position on the multiplex section of the same port.

It should be noted that, for simplification, direct or indirect regeneration section alarms have not been considered here.

The table below indicates (marked with a cross) in which cases in general these remote alarms are generated by the SONET/SDH interface cards of an IP/MPLS router.

| Inputs of the management unit 122 | | | | Outputs of the unit 122 | |
|---|---|---|---|---|---|
| MS-AIS | MS-RDI | AU-AIS | AU-RDI | MS-RDI | AU-RDI |
|  |  | X |  |  | X |
|  |  |  | X |  |  |
| X |  | X |  | X | X |
|  | X |  | X |  |  |
| X |  |  |  | X |  |
|  | X |  |  |  |  |

For example, when an AU-AIS alarm is detected by the unit 121 (upstream of the port), an AU-RDI alarm is inserted in the containers of the corresponding path leaving from the port towards the upstream of said port. Etc.

In the case of an IP/MPLS type communication network, in general, the IP/MPLS routers closest to the element of the network which is the source of a failure on the long-distance IP/MPLS network take the SONET/SDH alarms described above as a basis for activating the IP/MPLS protection/restoration mechanisms also described above for re-establishing the IP/MPLS traffic. As regards the routers remote from this element, they instead in general take the reception of IP/MPLS control messages as a basis.

Thus, for each SONET/SDH path, each SONET/SDH port 11 of an IP/MPLS router 1 must supply the SONET/SDH alarms to the routing units of the same router as soon as they are detected. IP rerouting is in general activated and then carried out by the routing unit or units 20 of the router 1 closest to the faulty element as soon as the SONET/SDH alarm is received by this unit.

SUMMARY OF THE INVENTION

In general terms, the invention concerns a system for protecting a communication network, said communication network including a transport network and path terminating elements, such as routers, respectively connected to said transport network by connection sections, said protection system comprising, for each communication path between two of said path terminating elements, a first protection system and a second protection system.

The invention applies in particular when said transport network is a synchronous hierarchy network of the SDH or SONET type, the first protection system being used for re-establishing the SDH or SONET path between the two routers which form said path terminating elements. Said second protection system is in particular an IP/MPLS type protection/restoration system.

Simultaneous use of IP/MPLS protection/restoration mechanisms and SONET/SDH protection/restoration mechanisms in a long-distance IP/MPLS network supported by SONET/SDH equipments requires coordination between the IP/MPLS routers and the SONET/SDH equipments. This is because, if the faulty element belongs to the SONET/SDH transport network, it is only the SONET/SDH protection/restoration mechanism which must be activated since, in the contrary case, the IP/MPLS protection/restoration mechanisms could disrupt the traffic unnecessarily and over a longer duration. Conversely, if the failure is situated outside the field of action of the SONET/SDH protection mechanisms, in this case on the connection sections between the transport network 3 and the path terminating elements such as the routers 1, the IP/MPLS protection/restoration mechanisms must react as quickly as possible.

In order to provide this simultaneous use of IP/MPLS and SONET/SDH protection/restoration mechanisms, a known method which is used on existing IP/MPLS routers consists of indiscriminately masking for a certain period of time, whereof the duration is configurable from 0 seconds (masking disabled) up to a value of several seconds, in steps of one or more milliseconds, all SONET/SDH alarm information that the SONET/SDH port 11 supplies to the routing unit 20. Masking means 123 are then used to mask all the SONET/SDH alarm messages intended to be transmitted to the routing unit 20 (see FIG. 2).

Thus, SONET/SDH protection/restoration mechanisms are used, when possible, during the masking period and it is only when they cannot succeed that IP/MPLS protection/restoration mechanisms are used.

This method is effective where the entire SONET/SDH path is protected (that is to say by a SONET/SDH type protection/restoration) both on the long-distance transport network 3 (for example with dedicated end-to-end protection, or with a multiplex section shared ring protection, or with dynamic restoration) and on the connection sections between each IP/MPLS router 1 to a SONET/SDH equipment of the transport network 3 (for example with multiplex section protection).

Nevertheless, the simultaneous use of IP/MPLS protection/restoration mechanisms and SONET/SDH protection/restoration mechanisms is in general expensive on account in particular of the use of multiplex section protection which necessitates that twice as many SONET/SDH ports are used on the IP/MPLS routers than if the connection sections were not protected by a SONET/SDH protection mechanism. However, the SONET/SDH ports of IP/MPLS routers are more expensive than the SONET/SDH ports of SONET/SDH equipments.

The aim of the present invention is to propose a protection system which makes it possible to solve the problem of the cost of using SONET/SDH multiplex section protection/restoration, in particular as regards the connection sections between the routers and the transport network.

To that end, a system for protecting a communication network according to the present invention is characterised in that, for each communication path between two of said path terminating elements,
  said first protection system is used upon detection of a fault in said transport network, said transport network then sending a direct path alarm to the path terminating element at the downstream end of said path, and
  said second protection system used either after detection, by one of the path terminating elements, of a fault on the connection section connecting it to said transport network, or upon reception, by the element at the downstream end of said path, of a direct or indirect path alarm sent by said transport network, said second protection system being used with a delay that is longer after reception of a path alarm than after detection of a fault on the connection section between said transport network and said path terminating element or than after reception of an indirect path alarm.

A protection system according to the invention applies to a communication network whereof each path terminating element comprises activation means for activating the use of said second protection system and the sending of an indirect path alarm to the element at the upstream end of said path, via said transport network. In this case, each path terminating element comprises means for delaying the activation of said activation means with a delay that is longer after reception of a path alarm than after detection of a fault on the connection section between said transport network.

Advantageously, the duration of each delay applied for a path is independent of the duration of each delay applied for any other path of said communication network.

The present invention also concerns a method of protecting a communication network, such as just described, which comprises, for each communication path between two of said path terminating elements, a first protection step and a second protection step.

This method is characterised in that said first protection step is used upon detection of a fault in said transport network, said step including the sending of a direct path alarm to the path terminating element at the downstream end of said path, in that said second protection step is used either after detection, by one of the path terminating elements, of a fault on the connection section connecting it to said transport network, or upon reception, by the element at the downstream end of said path, of a direct or indirect path alarm sent by said transport network, and which is then characterised in that said second protection step is used with a delay that is longer after reception of a direct path alarm than after detection of a fault on the connection section between said transport network and said path terminating element or than after reception of an indirect path alarm.

The characteristics of the invention mentioned above, and others, will emerge more clearly from a reading of the following description of an example embodiment, said description being produced in connection with the accompanying drawings.

DETAILED DESCRIPTION OF A PREFERRED EMBODIMENT

The basis of the present invention is to find a solution to the problem of high cost mentioned above in the protection of the connection sections linking the path terminating elements, such as the IP/MPLS routers 1, to the SONET/SDH equipments of the transport network 3, not by a SONET/SDH protection mechanism, but solely by one of the IP/MPLS protection/restoration mechanisms on the IP/MPLS packet traffic of this connection section. Nevertheless, in order to avoid the IP/MPLS protection/restoration mechanisms disrupting the IP/MPLS packet traffic unnecessarily and over a longer duration, the IP/MPLS protection/restoration mechanisms must be activated without delay if the failure has occurred on the section for connecting the IP/MPLS routers to the SONET/SDH equipments, whereas if it has occurred in the long-distance transport network, they must not be activated or only be activated belatedly.

It should be understood that the method of the prior art which has been described previously and which consists of masking for a certain period of time and indiscriminately all SONET/SDH alarm information that the SONET/SDH port 11 must normally supply to the routing unit 20 does not allow this behaviour to be carried out efficiently. This is because, if the duration of the SONET/SDH alarm information masking is configured at 0 seconds (masking is disabled), a failure alarm generated for a short instant (one or more milliseconds) by a SONET/SDH equipment following a failure that has occurred in the transport network and which impacts a SONET/SDH path (this alarm is of the VC-AIS type, that is to say of SONET/SDH path type), immediately activates the IP/MPLS protection/restoration mechanisms, just before re-establishment of the SONET/SDH path by the SONET/SDH protection/restoration mechanism used in the long-distance transport network. On the other hand, if the duration of the SONET/SDH alarm information masking is configured strictly greater than 0 seconds (masking is enabled), a failure alarm for the multiplex section following a failure of the connection section linking an IP/MPLS router to a SONET/SDH equipment will not immediately activate the IP/MPLS protection/restoration mechanisms, alone making it possible to re-establish the IP/MPLS traffic that takes the SONET/SDH paths supported by this multiplex section, but only after the duration of the SONET/SDH alarm information masking.

Consequently, the present invention proposes a solution that also makes it possible to solve the problem of the inefficiency of the method described previously, in the case where SONET/SDH protection/restoration mechanisms are used in the long-distance transport network except on the connection sections linking the IP/MPLS routers and the SONET/SDH equipments, and where IP/MPLS protection/restoration mechanisms are used in the long-distance IP/MPLS network.

The communication network to which the present invention applies therefore includes a transport network, for example of the SDH or SONET synchronous hierarchy type, and routers, for example of the IP/MPLS type, respectively connected to said SDH/SONET transport network, by connection sections. According to the present invention, said protection system comprises, for each communication path between two of said routers, a first protection system (of the SDH/SONET type where the transport network is of the SDH/SONET type), used upon detection of a fault in said transport network, said transport network then sending a direct path alarm (generally denoted AU-AIS) to the router at the downstream end of said path, and a second protection system (for example of the IP/MPLS type) used either after detection, by one of the end routers of said path, of a fault on the connection section connecting it to said transport network, or upon reception, by the router at the downstream end of said path, of a path alarm sent by said transport network.

Figure 3:
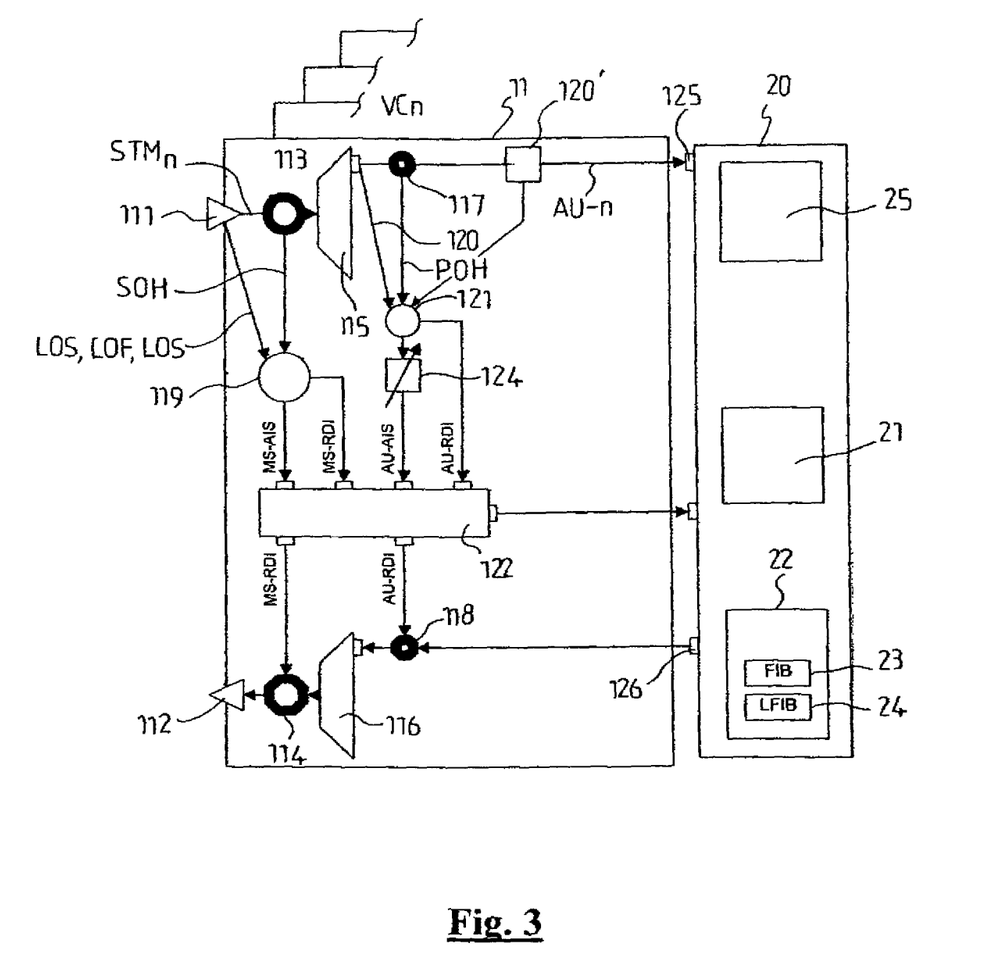
FIG. 3 is a general block diagram of router equipped with the means of the present invention.

In FIG. 3, the same elements as those already present in FIG. 2 have the same references.

The router shown in FIG. 3 differs from that depicted in FIG. 2 in that the masking element 123 no longer exists and in that a new masking element 124 is provided for masking only SONET/SDH direct path alarms, that is to say of the AU-AIS type. In FIG. 3, this masking element is placed between the unit 121 and the unit 120. Thus, the masking is applied not only for the other cards of the IF/MPLS router but also for the unit that generates the SONET/SDH indirect path alarms, that is to say of the AU-RDI type.

Thus, the method of the present invention consists of no longer applying the alarm information masking in an undifferentiated manner to all SONET/SDH alarms as was the case in the known method explained above, but solely to AU-AIS SONET/SDH direct path alarms.

More generally, by taking account of the fact that it can be advantageous to delay all alarms, in particular MS-AIS alarms, the present invention consists of means allowing IP/MPLS type protection to be used with a delay that is longer after reception of an AU-AIS path alarm than after detection of a fault on the connection section between said transport network and said router, that is to say after detection of an MS-AIS alarm or another different from AU-AIS.

Figure 4A:
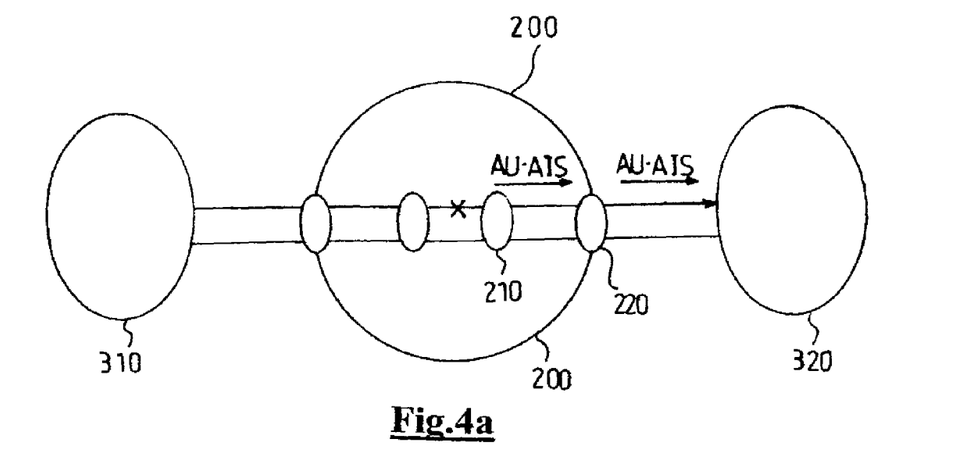
FIGS. 4a to 4c are three diagrams explaining the use of the restoration mechanisms of the present invention applied to three faults respectively detected at three different places on the communication network.
Figure 4B:
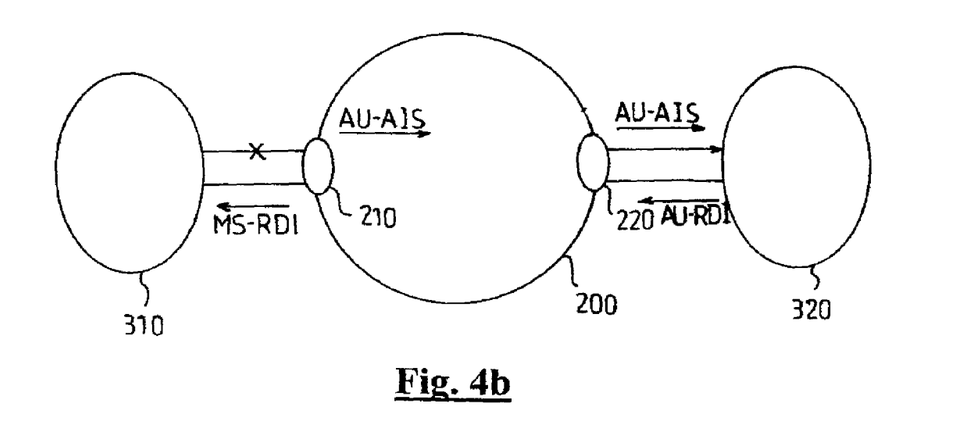
Figure 4C:
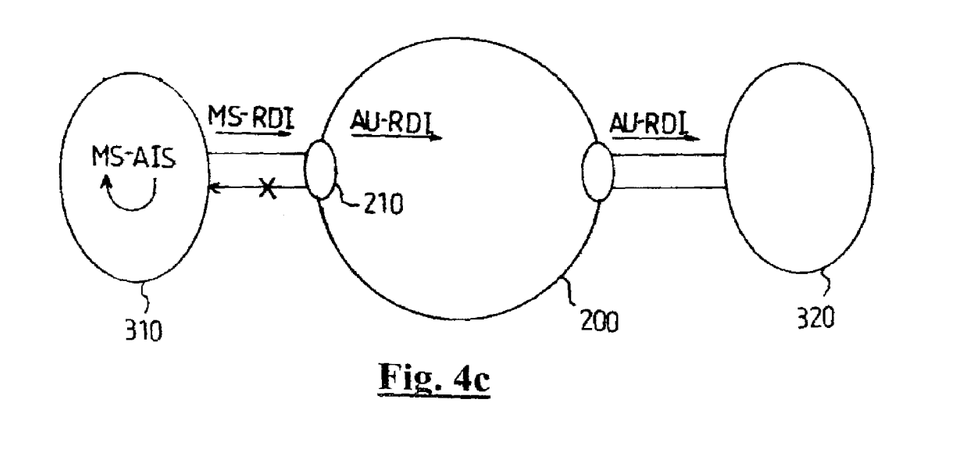

The operation of the present invention is now described in connection with FIGS. 4a, 4b and 4c which depict schematically a SONET/SDH type transport network 200 consisting of a plurality of SONET/SDH equipments 210, 220, 230, etc. and linked to two IP/MPLS routers 310 and 320.

When a failure (represented by a cross) occurs in the long-distance transport network 200, for example in a section between two SONET/SDH equipments (see FIG. 4a), the SONET/SDH equipment 210 downstream of the failure, on account of it being situated at the section end, generates a SONET/SDH direct path alarm (AU-AIS), which is normally propagated to the SONET/SDH interface card of the IP/MPLS router 320 (for example, by the "all 1s signal" technique). Immediately, the SONET/SDH protection for restoration of the section concerned is activated. Conventionally also, no multiplex section alarm (MS-AIS or MS-RDI) appears on the connection section linking the IP/MPLS router 320 to the closest SONET/SDH equipment 220. The alarm information masking element 124 masks or delays for a given duration the AU-AIS alarm to the routing unit 20 of the IP/MPLS router 320 downstream of the failure, with the result that no IP/MPLS protection is activated immediately and the MPLS traffic continues to take the direction of the SONET/SDH path not impacted by the failure. Moreover, the alarm information masking element 124, on account of it being situated between the unit 121 and the unit 122 of the port 11 of the router 320, also masks for a given duration the AU-AIS alarm to the unit 122 which is normally provided for generating the SONET/SDH indirect path alarm (AU-RDI). As a result, the router 310 upstream of the failure does not receive immediately, or at all, a SONET/SDH remote path failure alarm (AU-RDI) and, consequently, it does not activate IP/MPLS protection. During this time, the SONET/SDH protection of the long-distance transport network 200 re-establishes the SONET/SDH paths impacted by the failure in a given time. It should be noted that the AU-AIS alarm is then no longer transmitted to the SONET/SDH card of the IP/MPLS router downstream of the failure before the alarm masking time has elapsed. In this case, no IP/MPLS protection is activated.

It should also be noted that, if the equipment directly downstream of the fault is a regeneration equipment, this equipment will send a direct multiplex section alarm MS-AIS and that it is only the equipment downstream of the multiplex section in which the fault has occurred that will send a direct path alarm AU-AIS. In short, this does not change the process at the downstream router 320.

When a failure occurs on a connection section that connects an IP/MPLS router 310 to the first SONET/SDH equipment 210 of the long-distance transport network 200, in the direction from the IP/MPLS router 310 towards the SONET/SDH equipment 210 (see FIG. 4b), this SONET/SDH equipment 210 generates an indirect multiplex section alarm (MS-RDI) in the opposite direction, which is then detected by the local IP/MPLS router 310. The indirect multiplex section alarm (MS-RDI) information is immediately retransmitted to the routing unit 20 of the IP/MPLS router 310, which immediately activates either IP rerouting or local switching of one of the end-to-end or local MPLS-TE protections for the protected MPLS traffic. The SONET/SDH equipment 210 downstream of the failure also generates a SONET/SDH direct path alarm (AU-AIS) (being at the downstream end of a multiplex section), which is propagated (for example by the "all 1s" signal technique) downstream of the failure to the SONET/SDH port 11 of the path terminating element, in this case the remote IP/MPLS router 320. On this remote IP/MPLS router 320, this SONET/SDH direct path alarm (AU-AIS) is masked for a given duration, during which the protected (but not yet taking its LSP protection path) MPLS traffic continues to take the direction of the SONET/SDH path not impacted by the failure. At the end of this duration, the SONET/SDH direct path alarm (AU-AIS) information is transmitted, on the one hand, to the routing unit 20 of the local IP/MPLS router 310, which activates local switching of one of the end-to-end or local IP/MPLS protections for the protected MPLS or IP traffic and, on the other hand, to the element 118 which must generate the SONET/SDH indirect path alarm (AU-RDI) in the direction opposite to the failure.

When a failure occurs on a connection link linking an IP/MPLS router 310 to the first SONET/SDH equipment 210 of the long-distance transport network 200, in the direction from the SONET/SDH equipment 210 towards the IP/MPLS router 310 (see FIG. 4c), the SONET/SDH port 11 of the IP/MPLS router 310 immediately (there is no masking) transmits, to the routing unit 20 of the router, the direct multiplex section alarm (MS-AIS) that it detects. The routing unit 20 of the IP/MPLS router 310 then immediately activates either IP/MPLS rerouting or local switching of one of the end-to-end or local MPLS-TE protections for the protected MPLS traffic. Similarly, the direct multiplex section alarm (MS-AIS) information is immediately retransmitted to the element 122 which generates in the opposite direction an indirect multiplex section alarm (MS-RDI) which is detected only by the attached SONET/SDH equipment 210 and a SONET/SDH indirect path alarm (AU-RDI) which is detected by the remote IP/MPLS router 320, which immediately activates local switching of one of the end-to-end or local IP/MPLS protections for the protected MPLS or IP traffic.

According to another characteristic of the present invention, the configuration of the SONET/SDH direct path alarm (AU-AIS) information masking duration is independent for each of the SONET/SDH paths supported by the SONET/SDH card of the IP/MPLS router. This makes it possible to disable the alarm masking (duration configured at 0 seconds) for certain SONET/SDH paths not protected by a SONET/SDH protection/restoration mechanism of the long-distance transport network, or to enable it (duration configured at a value strictly greater than 0) up to a value of several seconds, in steps of one or more milliseconds, according to the type of SONET/SDH protection/restoration that protects each of the other paths on the long-distance transport network (dedicated path protection in less than 50 milliseconds, multiplex section shared ring protection in less than 50 milliseconds, or dynamic restoration in a few seconds).

The invention claimed is:

1. A system for protecting a communication network, said communication network including a transport network and so-called path terminating elements respectively connected to said transport network by connection sections, said protection system having a first and a second protection system, the network protecting system being arranged so that for each communication path between two of said path terminating elements: said first protection system is used upon detection of a fault in said transport network, said transport network then sending a direct path alarm to the element at a downstream end of said path, and said second protection system is used either after detection, by one of the terminating elements of said path, of a fault on the connection section connecting it to said transport network, or upon reception, by the element at the downstream end of said path, of a direct or indirect path alarm sent by said transport network, a delay arrangement for activating said second protection system with a delay that is longer after reception of a direct path alarm than after detection of a fault on the connection section between said transport network and said path terminating element; the first protection system being arranged for changing the communication path from the path having the fault to another communication path in response to detection of the fault in the transportation network; the second protection system being arranged for changing the faulty connection section to another connection section in response to detection of the fault on the faulty connection section.

2. The system for protecting a communication network according to claim 1, wherein said transport network includes a synchronous hierarchy network of the SDH or SONET type, the first protection system being a protection/restoration system for re-establishing the SDH or SONET path between said two path terminating elements.

3. The system for protecting a communication network according to claim 1, wherein said second protection system is a protection/restoration system of the IP, MPLS or ATM type.

4. The system for protecting a communication network according to claim 1, wherein each path terminating element comprises an activator for (a) activating use of said second protection system and (b) sending an indirect path alarm to the element at the upstream end of said path, via said transport network, each path terminating element comprising a delay arrangement for delaying the activation of said activator with a delay that is longer after reception of a direct path alarm than after detection of a fault on the connection section between said transport network and said path terminating element.

5. The system for protecting a communication network according to claim 1 wherein the duration of each delay applied for a path is independent of the duration of the delay applied for any other path of said communication network.

6. A method of protecting a communication network, said communication network including a transport network and path terminating elements, respectively connected to said transport network by connection sections, said protection method having, for each communication path between two of said path terminating elements, a first protection step and a second protection step, using said first protection step upon detection of a fault in said transport network, said first protection step including sending a direct path alarm to the path terminating element at a downstream end of said path, and using said second protection step in response to either (a) detection of a fault on the connection section connecting said faulty connection section to said transport network, or (b) upon reception of a direct or indirect path alarm sent by said transport network, delaying activation of said second protection step with a delay that is longer after reception of a direct path alarm than after detection of a fault on the connection section between said transport network and said path terminating element or than after reception of an indirect path alarm; the first protection step changing the communication path from the path having the fault to another communication path in response to detection of the fault in the transportation network; the second protection step changing the faulty connection section to another connection section in response to either (a) or (b), wherein both (a) and (b) can cause the second protection step to be performed.

7. The method of protecting a communication network according to claim 6, said method comprising activating said second protection step and the sending of an indirect path alarm to the path terminating element at the upstream end of said path, via said transport network, delaying the use of the activation step with a delay that is longer after reception of a path alarm than after detection of a fault on the connection section between said transport network and said path terminating element.

8. The method of protecting a communication network according to claim 6 wherein the duration of each delay applied for a path is independent of the duration of each delay applied for any other path of said communication network.

9. A path terminating element arranged to be connected to a transport network of a telecommunication network by a connection section, the element comprising, for each communication path to a second so-called path terminating element: a first activator arrangement for activating a first protection system in response to reception of a direct path alarm coming from said transport network, a second activator arrangement for activating a second protection system used either after detection of a fault on the connection section connecting it to said transport network, or upon reception of a direct or indirect path alarm sent by said transport network, and a third activator arrangement for activating the second protection system with a delay that is longer after reception of a direct path alarm than after detection of a fault on the connection section between said transport network and said path terminating element; the first protection system being arranged for changing the communication path from the path having the fault to another communication path in response to activation of the first protection system by the first activator arrangement; the second protection system being arranged for changing the faulty connection section to another connection section in response to activation of the second protection system by either the second or third activator arrangements, wherein both the second and third activator arrangements can activate the second protection system.

10. The system of claim 1 wherein the second protection system is also arranged for automatically changing the faulty connection section to another connection section in response to reception of a direct or indirect path alarm sent by said transport network.

11. The system of claim 10 wherein the second protection system is arranged to be responsive to reception of the direct or indirect path alarm by said element at the downstream end of said path.

12. The method of claim 6 wherein said reception is by said element at the downstream end of said path.

13. The system for protecting a communication network according to claim 2, wherein said second protection system is a protection/restoration system of the IP, MPLS or ATM type.

* * * * *